2 Sheets—Sheet 1.

R. KITSON.
BEATERS FOR COTTON OPENERS AND PICKERS.

No. 173,172.     Patented Feb. 8, 1876.

Witnesses,
Alfred K. Garland
John Brumey

Inventor,
Richard Kitson
By Rice & Pratt
Attys.

R. KITSON.
BEATERS FOR COTTON OPENERS AND PICKERS.

No. 173,172. Patented Feb. 8, 1876.

UNITED STATES PATENT OFFICE.

RICHARD KITSON, OF LOWELL, MASSACHUSETTS.

IMPROVEMENT IN BEATERS FOR COTTON OPENERS AND PICKERS.

Specification forming part of Letters Patent No. 173,172, dated February 8, 1876; application filed November 29 1875.

*To all whom it may concern:*

Be it known that I, RICHARD KITSON, of Lowell, Massachusetts, have invented certain Improvements in Beaters for Cotton Openers and Pickers, of which the following is a specification:

My invention relates to machines used in opening and beating cotton and other fibrous substances, and especially to a new mode of inhanging the beater-blades in such machines upon their shafts. Its objects are to economically secure resiliency in the action of the beater upon the cotton, and to preserve at the same time the strength and durability of the arm in its attachment to the shaft.

Figure 1:
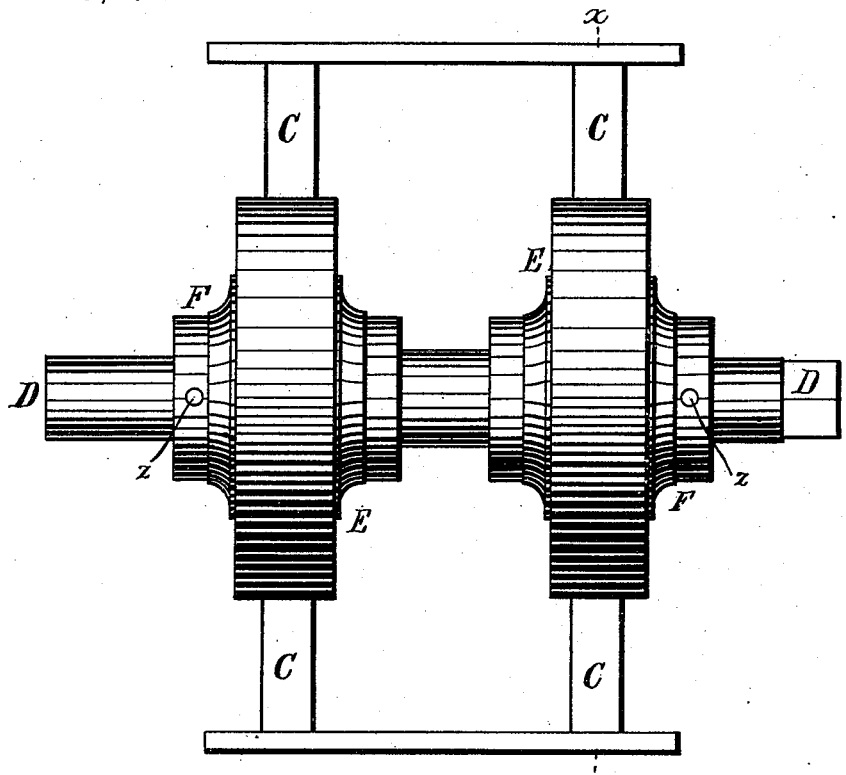
Figure 2:
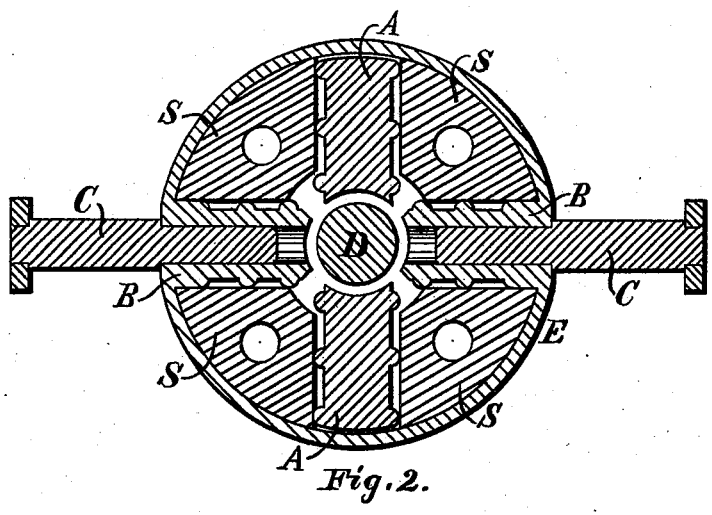
Figure 3:
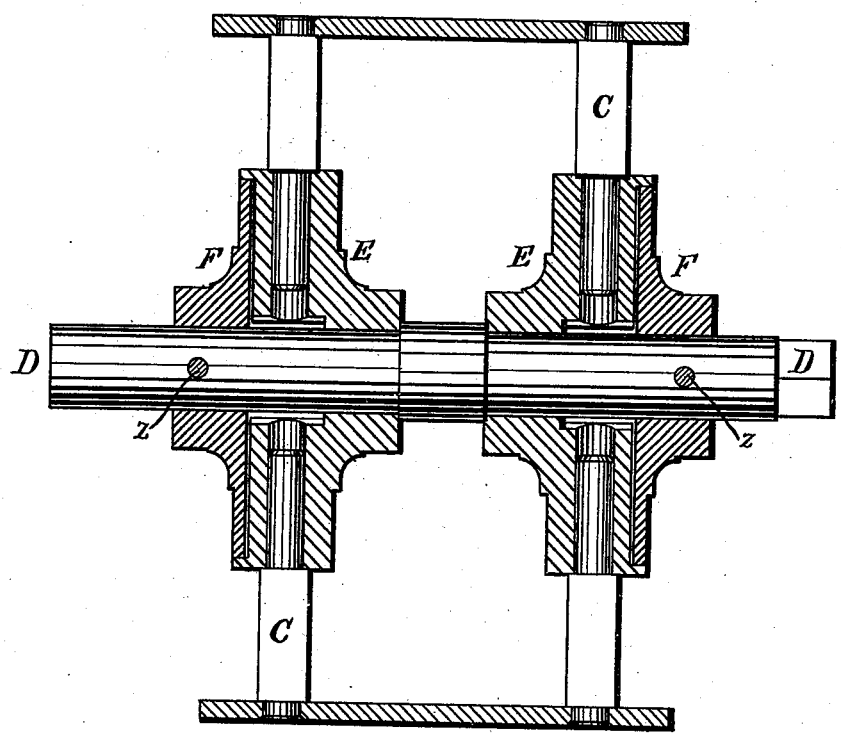
Figure 4:
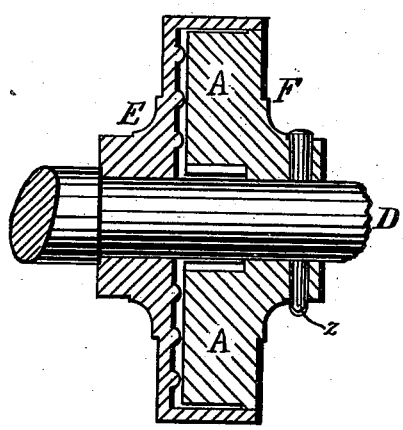
Figure 5:
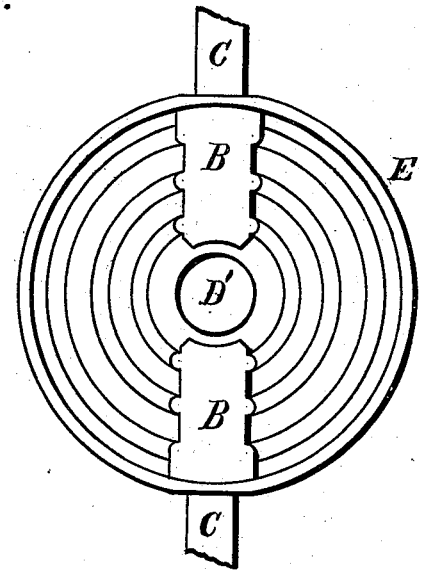

In the drawings, Figure 1 is a view of my spring-box attachment and beater complete and ready for operation, showing the relative position of the blades, arms, and shaft, and the disks E and F. Fig. 2 is a sectional view of my improvements on the line $x\ x'$ in Fig. 1, showing the relative position of the shaft D, the abutments A A, the springs S S S S, the abutments B B, and the arms C C. Fig. 3 is a sectional view of my improvements on a plane passing through the center of the blades, shaft, and arms of the beater, showing the abutments B. Fig. 4 is a section of one of my spring-box attachments on the shaft, in a plane at right angles to that in Fig. 3, and showing the abutments A A in section. Fig. 5 is an interior view of the disk E, showing the bearing D' in which it yields or turns on the shaft, the abutments B B, and segments of the arms C C attached, and the ribbed or corrugated interior construction of the disk.

The disk E is made to fit and turns loosely upon the shaft of the cotton-beater at one end, and upon the disk F at the other, and is provided with projections or radial abutments B B, extending inward from the circumference of the disk toward the center. These projections B B are of sufficient width, thickness, and firmness to hold the arms C C securely, and also to form abutments upon which the abutments A A, by the intermediate springs S, act to drive the disk E and beater attached. Into the disk E and abutments B B are screwed or otherwise secured the beater-arms C C, to which the blades of the beater are attached.

The disk F is splined or attached firmly to the shaft D, and has secured to it the abutments A. The disk F is then placed so that these abutments shall have the position in relation to the abutments B shown in Fig. 2, and four springs of india-rubber, or other suitable elastic material, S, are fitted into the spaces between the abutments, as shown, and serve to connect the beater to its shaft. Instead of india-rubber, any suitable spring of other material and form may be used within the box formed of the disks E F. The inside of the disk E and the abutments B B, when rubber springs are used, as described, is made ribbed or beaded, as shown in the drawing, to afford space for displacement of the springs S S, when compressed. These two disks fit and correspond to each other, and are placed together, so that the abutments A A fall between the abutments B B, and engage with them, by the intermediate springs S, in such manner that when the shaft D is revolved both disks, and the arms and blades attached, are revolved with it, and also so as to form a closed and smooth box on the outside about the shaft, which protects all the bearings, springs, and other parts from dust, and from clogging with fiber. Between the abutments A and the abutments B, when the two disks are placed together substantially as shown in the drawings and described above, are spaces allowing considerable play of the abutments to and from each other; and as the disk E is made so as to revolve upon and against the shaft D and disk F, except as limited by the abutments, this play of the abutments in the spaces between them admits of the turning upon the shaft of the blade of the beater through a part of an arc of its revolution. In these spaces between the opposing sides of the abutments A and B I insert, as before mentioned, springs, which tend to keep the disks and their abutments in the same relative position to each other, with sufficient firmness to withstand the ordinary or least average resistance. These springs S S operate so as to yield considerably before any sudden or extraordinary resistance to the beater-blade has been offered, and to return to their ordinary shape when it is passed, and thus restore the abutments to their ordinary relative position; and by this arrangement of springs, one on each side of each abutment, the points of resistance are continually brought against resilient surfaces, so that all jarring is overcome, whether from the yield of the beater to masses of cotton, or from the return of the beater to its place on the shaft, by the reaction of the springs behind it.

The operation of the beater embodying my spring-box attachment is as follows: The shaft D is mounted and revolved in the ordinary manner, and carries with it, by means of the abutments A A and B B, and the intermediate springs S S, the arms and blades of the beater, to which the cotton or other fibrous material is fed in the usual manner; but the blade strikes a softened or yielding blow instead of a rigid and cutting blow, as is the case in the ordinary beater, and when the blade strikes a lump or tuft of cotton, or other hard substance, the blade yields for an instant, and falls back through a part of its arc, and is immediately restored to its place, when the lump is loosened or the resistance passed, by the action of the spring behind it.

By this means the cotton is not cut or torn abruptly apart; the blade, though yielding, remains always in the same circle, and allows no portion of the cotton to pass over it unbeaten; the constant jarring incident to the ordinary rigid beater is overcome, and no part of a revolution is lost; and, consequently, there is no slipping of the belts, and less wear of machinery, while the cotton is more completely shaken apart and loosened up without breaking the fiber, and much more is accomplished with less power than is the case with the other beaters in use, and for these reasons yielding beaters are now used.

It will also be seen that every part of my invention is so constructed and held together that no danger or damage can occur from breakage or displacement, and in this lies the present invention.

The best operating yielding beater yet found is that which yields upon the shaft on which it runs, and performs as effective service as the rigid beater, while relieving the machine from shocks and jars; but it has heretofore been difficult, expensive, and dangerous to use this kind of beater, because of the exposure of the springs to clogging, their great cost, and the danger of their being broken, or of breaking the beater when they reacted under great pressure. All of these difficulties my present invention is designed to overcome.

What I claim as new, and my invention, is—

1. The combination, with the beater-arms and shaft, of a tightly-closed box, covering and protecting the elastic springs which unite the arms to the shaft, substantially as described.

2. The combination of the abutments B, attached to the beater-arms, with the yielding springs S, and the abutments A attached to the beater-shaft, substantially as described.

3. The combination of the cup-shaped disk E, carrying the beater-arms, with the beater shaft D, the disk F attached to the shaft, and interposed bearings to prevent the disk E from complete revolution on the shaft, substantially as described.

4. The combination of the cup or box-shaped disk E with the beater-arms C, substantially as described.

5. In combination with the elastic springs S, the closed box formed of the disks E and F, provided on its interior surface with corrugations or ridges to facilitate the compression and expansion of the elastic springs, allowing the beater to yield, substantially as described.

RICHARD KITSON.

Witnesses:
SAML. E. STOTT,
D. HULL RICE.